United States Patent [19]
Chung et al.

[11] Patent Number: 6,000,913
[45] Date of Patent: Dec. 14, 1999

[54] LOW PROFILE FUEL DELIVERY MODULE

[75] Inventors: Ha To Chung, Canton; Matthew Louis Stein, Northville, both of Mich.

[73] Assignee: Ford Motor Company, Dearborn, Mich.

[21] Appl. No.: 09/139,100

[22] Filed: Aug. 24, 1998

[51] Int. Cl.$^6$ .................................................. F04B 19/24
[52] U.S. Cl. ........................... 417/53; 417/360; 417/40; 417/423.3; 417/423.15
[58] Field of Search ............................ 417/53, 40, 360, 417/423.3, 423.15

[56] References Cited

U.S. PATENT DOCUMENTS

| | | |
|---|---|---|
| 3,470,907 | 10/1969 | Shockey . |
| 4,706,707 | 11/1987 | Betterton et al. . |
| 4,750,513 | 6/1988 | Griffin et al. . |
| 4,750,518 | 6/1988 | Griffin et al. . |
| 4,869,225 | 9/1989 | Nagata et al. . |
| 4,878,518 | 11/1989 | Tuckey . |
| 4,945,884 | 8/1990 | Coha et al. . |
| 5,038,741 | 8/1991 | Tuckey . |
| 5,044,526 | 9/1991 | Sasaki ..................................... 222/377 |
| 5,046,471 | 9/1991 | Schmid . |
| 5,070,849 | 12/1991 | Rich et al. . |
| 5,080,077 | 1/1992 | Sawert et al. . |
| 5,107,889 | 4/1992 | Sasaki et al. . |
| 5,146,901 | 9/1992 | Jones . |
| 5,195,494 | 3/1993 | Tuckey . |
| 5,211,547 | 5/1993 | Gaston ..................................... 417/360 |
| 5,237,977 | 8/1993 | Tuckey . |
| 5,415,146 | 5/1995 | Tuckey . |
| 5,522,425 | 6/1996 | Kroiss et al. . |
| 5,551,835 | 9/1996 | Yu et al. . |
| 5,560,342 | 10/1996 | Fournier et al. . |
| 5,596,970 | 1/1997 | Schoenberg et al. . |
| 5,642,718 | 7/1997 | Nakai et al. . |
| 5,642,719 | 7/1997 | Brown . |
| 5,647,329 | 7/1997 | Bucci et al. . |
| 5,647,330 | 7/1997 | Sawert et al. . |
| 5,669,359 | 9/1997 | Kleppner et al. . |
| 5,699,773 | 12/1997 | Kleppner et al. . |

*Primary Examiner*—Timothy S. Thorpe
*Assistant Examiner*—Ehud Gartenberg
*Attorney, Agent, or Firm*—Donald A. Wilkinson

[57] ABSTRACT

A fuel pump module and method are provided for installation into a low profile fuel tank. A reservoir holds a substantially horizontally mounted fuel pump. A flange is mounted to the fuel tank to support the module. A link is pinned at one end to the flange and is pinned at a second end to the reservoir to provide a pair of articulable connections therebetween. A pair of springs urge separation between the link, reservoir and flange.

1 Claim, 3 Drawing Sheets

LOW PROFILE FUEL DELIVERY MODULE

BACKGROUND OF THE INVENTION

1. Field of the Invention

This invention relates to the field of fuel delivery modules for an automotive vehicle and more particularly to a horizontally mounted fuel module in a low profile fuel tank.

2. Discussion of the Prior Art

A fuel module may be mounted to the fuel tank of an automotive vehicle. In such an application, it is known to mount the module from an opening in the top of the fuel tank. A flange is provided on the module assembly to support the assembly to the tank.

Due to variations in the height of the fuel tank and variations in the height of the fuel module, it is necessary to provide a means to adapt the height of the fuel module to properly position the module assembly in the tank. Such proper positioning enables accurate measurement of the level of fuel in the fuel tank and enables proper positioning of the input to the fuel pump.

An example of a means to adapt the height of a vertically mounted module is provided in U.S. Pat. No. 4,945,884 ('884 patent). As shown in FIGS. 1 and 3 of the '884 patent, vertical guides 76 are provided to support the pump and reservoir assembly 22 with respect to the module flange 46 that is mounted to the fuel tank 10. A plurality of helical springs 88 are compressed between the reservoir 22 and flange 46 to urge the pump vertically downwardly toward the bottom of the tank 10. The arrangement described in the '884 patent provides for a vertically oriented fuel pump, which requires more vertical height than which is available in many applications.

An example of a horizontally mounted pump is described in U.S. Pat. No. 5,669,359 ('359 patent). The '359 patent provides a single rod 39 which acts to support the fuel pump and bias the pump downwardly toward the bottom of the fuel tank. This single rod 39 serves both functions of support and deflection. The rod 39 is limited in the amount of deflection which it can provide before plastic deformation or fracture occurs in the rod and is limited in the manner in which the rod is able to articulate as it bends. Therefore the module of the '359 patent may not articulate adequately to facilitate installation through a hole in the top of a low profile fuel tank.

It would therefore be desirable to provide a module which enables installation in a low profile fuel tank through a hole provided in the top of the fuel tank by articulating the module during installation and urging the module into engagement with the bottom of the fuel tank.

SUMMARY OF THE INVENTION

To provide a module which enables installation in a low profile fuel tank through a hole provided in the top of the fuel tank, a module is provided which is articulable during installation and which urges the module into engagement with the bottom of the fuel tank. By doing so, such a module may easily be installed into a low profile tank and accommodate any variations in the height of the tank or the module assembly.

To realize these objectives and advantages, a fuel pump module and method are provided for installation into a low profile fuel tank. A reservoir holds a substantially horizontally mounted fuel pump. A flange is mounted to the fuel tank to support the module. A link is pinned at one end to the flange and is pinned at a second end to the reservoir to provide a pair of articulable connections therebetween. A pair of springs urge separation between the link, reservoir and flange.

DESCRIPTION OF PREFERRED EMBODIMENTS

Figure 1:
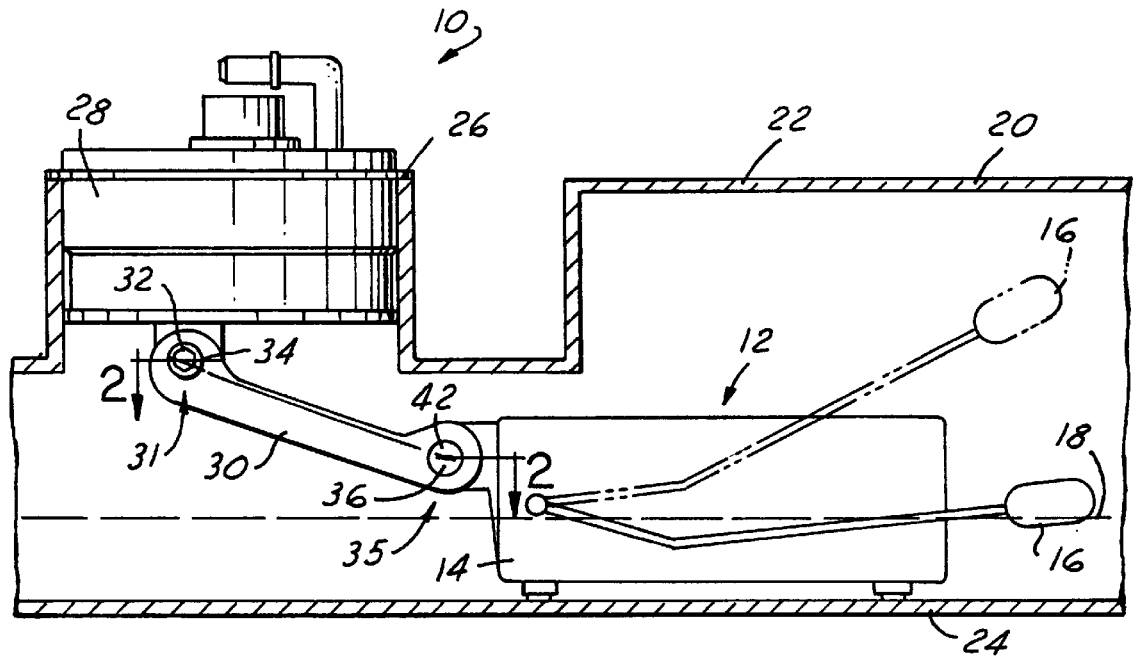
FIG. 1 is a side view of a fuel delivery module according to the present invention.

Referring now to FIG. 1, a fuel delivery module 10 is illustrated. The module 10 includes a reservoir/sender assembly 12. The reservoir assembly 12 includes a rigid plastic molded reservoir 14 encasing a fuel pump 15. A preferred pump is described in U.S. Pat. 5,596,970 and 5,551,835, assigned to the assignee of the present invention, which are incorporated herein by reference in their entirety. A fuel level sensor 16 is mounted to the reservoir 14 to measure the level of fuel 18 in a fuel tank 20 in a known manner.

The fuel tank 20 includes a horizontal upper surface 22 and a bottom 24. The module assembly 10 is inserted through a circular hole 26 in the top of the fuel tank 20. The module 10 includes a flange assembly 28 which is fixed to the hole 26 after installation of the module 10. The flange 28 supports the reservoir assembly 12 through a link 30. The link 30 is connected to the flange 28 at a first end 31 through thereof through a pinned 32 connection. The pinned connection 32 permits the link 30, and therefore the reservoir assembly 12, to articulate with respect to the flange 28 about a first axis 34. The second end 35 of the link 30 is attached to the reservoir assembly 12 through a second pinned connection 36. The second pinned connection 36 permits articulation of the reservoir assembly 12 with respect to the link 30 and the flange 28 about a second axis 40.

Through the pair of pinned connections, the reservoir assembly 12 is able to rotate with respect to the flange, as desired, to align the reservoir assembly 12 therewith to facilitate installation into the tank 20. Then as the module 10 is inserted further into the tank, the module 10 articulates about both axes 34, 40, thereby promoting easy assembly, as illustrated in FIGS. 4–7.

Figure 2:
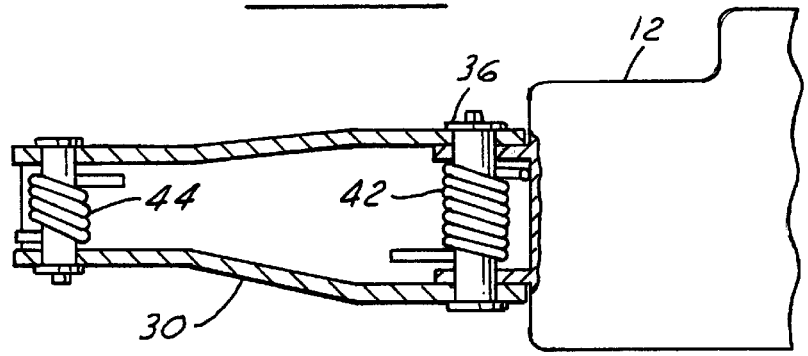
FIG. 2 is a partial sectional plan view of the fuel delivery module of FIG. 1.

The module assembly 10 further comprises a biasing means at each pinned connection 32, 36 to urge the reservoir assembly 12 against the bottom of the tank 20. In a preferred embodiment, as illustrated in FIG. 2, the biasing means comprises a first spring 42, in the form of a torsion spring wrapped about the second pinned connection 36. The first spring bears against the link 30 and the reservoir assembly 12 to urge these members apart. A filter (not shown) is housed in the flange 28. The second biasing means comprises a second torsion spring 44 provided around the first pin 32.

Figure 3:
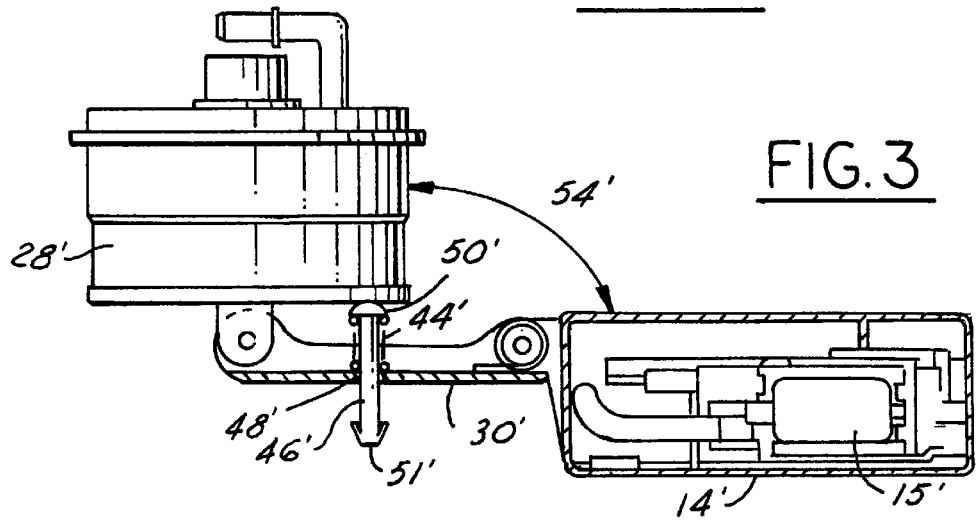
FIG. 3 is a partial sectional side view of an alternate embodiment of the module shown in FIG. 1 during installation into a fuel tank.

As illustrated in FIG. 3, the second biasing means alternatively comprises a second spring 44' provided between the flange 28' and the link 30'. This second spring 44' thus biases the link 30' from the flange 28'. Preferably the second spring 44' comprises a compressed helical spring. The helical spring is retained by a pin 46' inserted through a hole 48' provided in the link 30'. A first end of the pin 50' is flanged to bear against the end of the spring 44' distal from the link 30' and the second end 51' of the pin 46' is flanged (or provided with expandable legs) to retain the pin against the link 30'. The first end 50' of the pin 46' bears against the flange 28', or is connected thereto.

Figure 4:
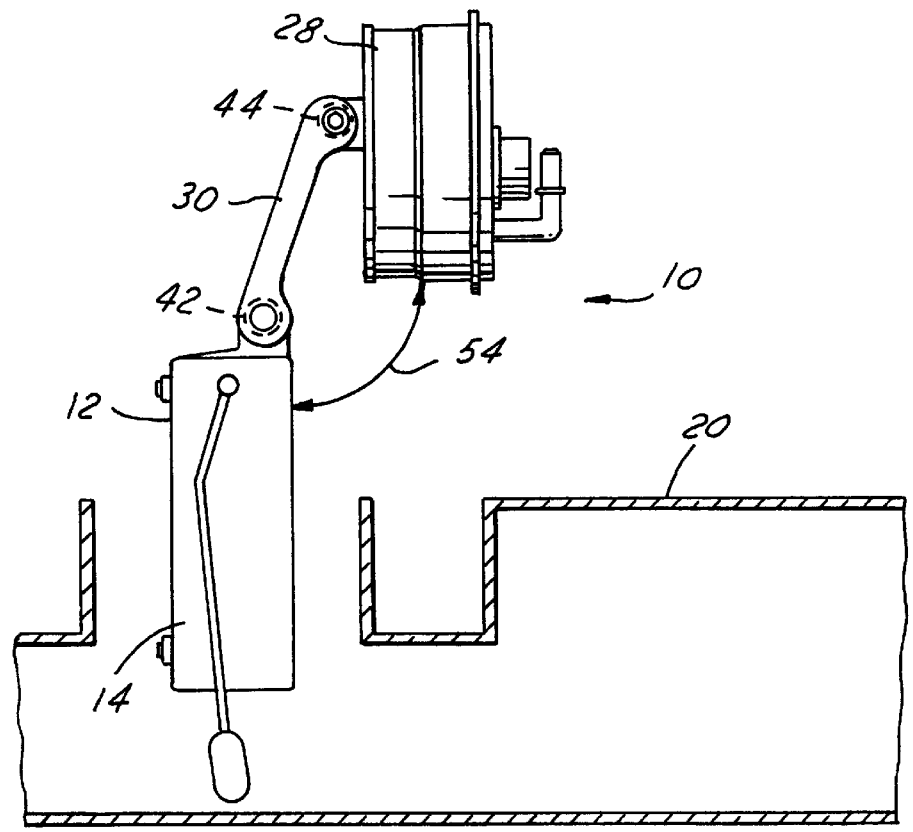
FIGS. 4–7 illustrate the fuel delivery module of FIG. 1 during stages of installation into a fuel tank.
Figure 5:
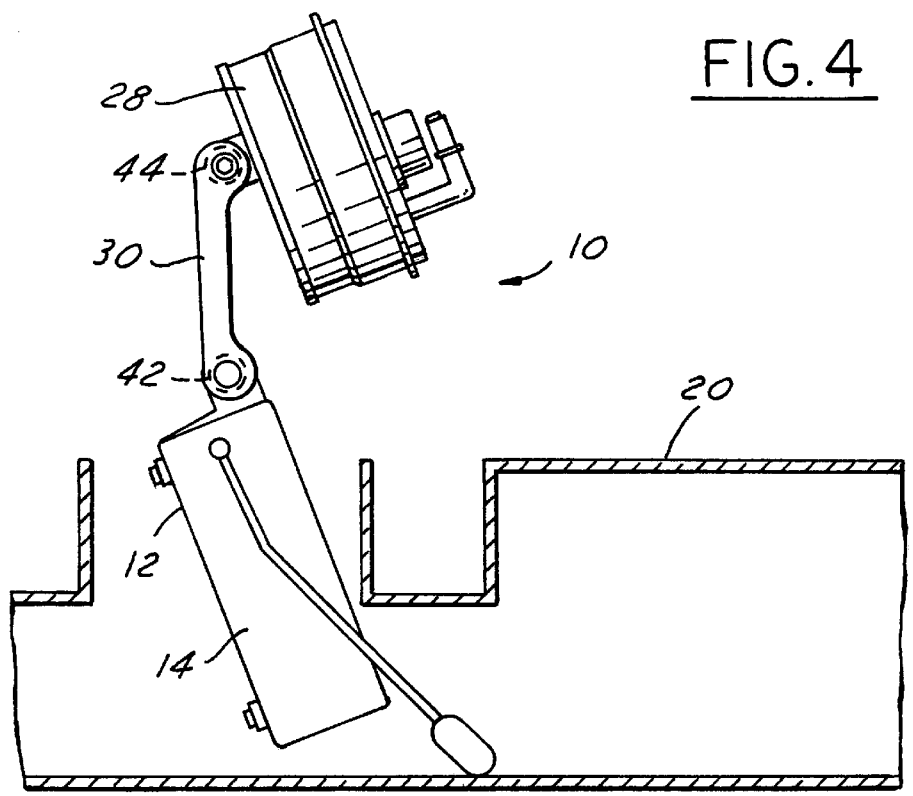
Figure 6:
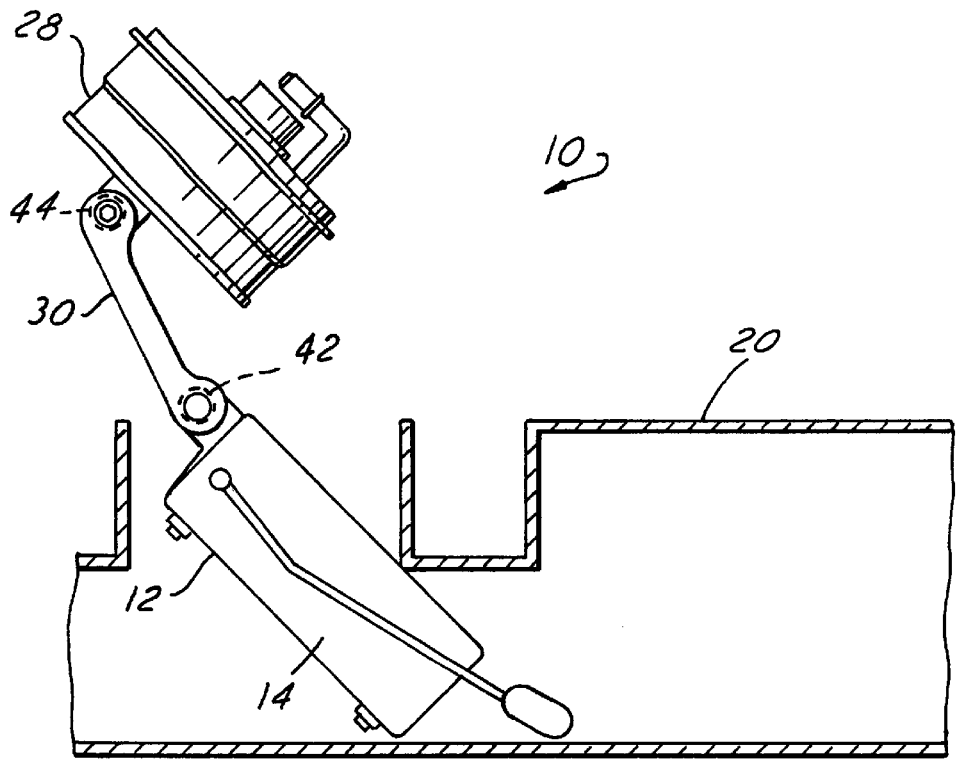
Figure 7:
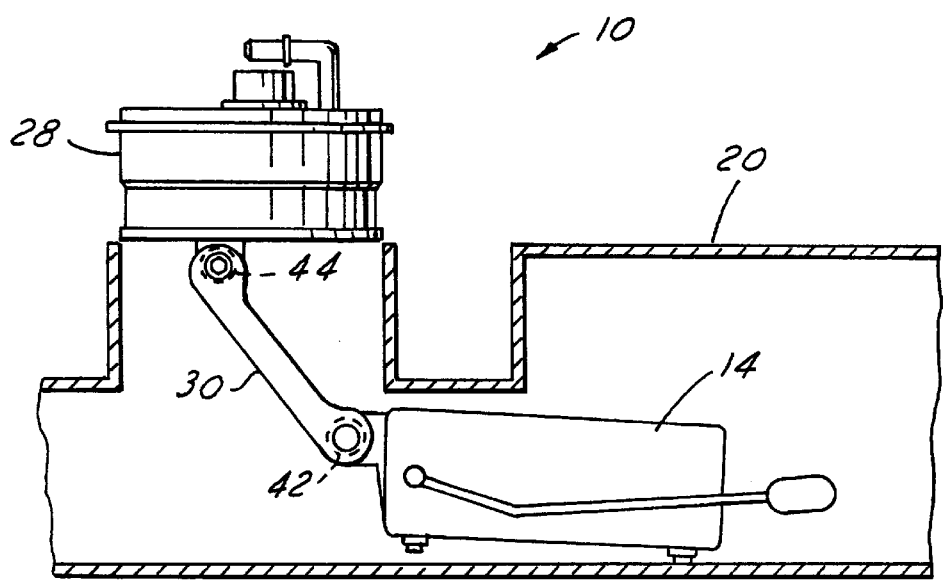

As illustrated in FIG. 4, prior to installation, springs 42, 44 urge the module 10 to a position biased open, where the angle 54 between the flange 28 and reservoir assembly 23 is greater than ninety degrees. In a preferred embodiment, as illustrated in FIG. 4, the second spring 44 is in a partially compressed state during most, if not all, of the installation process. As the module 10 is initially inserted into the tank 20, as illustrated in FIG. 4, the reservoir 12 is substantially vertical (and substantially aligned with the link 30). The module assembly 10 is rotated so the reservoir assembly 12 is less vertical while the module 10 is further inserted into the tank 20, as shown in FIG. 5. The reservoir 12 eventually contacts the bottom of the tank 20. This contact results in compression of the biasing means, as shown in FIG. 6 of a preferred embodiment, wherein the first spring 42 is compressed, thereby reducing the angle 54 between the flange 28 and reservoir 14. Alternatively, or additionally, second spring 44 could be further compressed. As the module 10 is further inserted into the tank 20, as illustrated in FIG. 7, the second spring 44 is either uncompressed, or is extended to a position where the flange 28 is substantially aligned with the opening 26 in the tank 20. In an alternative embodiment, as illustrated in FIG. 3, the first spring 42' is extended, increasing the angle 54' between the flange 28' and the reservoir 12' until the flange 28' may be seated to the tank 20' as shown in FIG. 1.

The springs 42, 44 and pinned connections 32, 36 thus permit articulation of the module 10 for assembly within a minimal height tank 20. Furthermore, these connections urge the reservoir 12 against the bottom of the tank 20, as shown in FIG. 1. The articulation accommodates any variation in height of either the module assembly 10 or the tank 20.

In a further alternative embodiment, the link 30 is made from a flexible material, thereby providing an additional degree of freedom for the articulation of the module assembly 10.

The forms of the invention shown and described herein constitute the preferred embodiments of the invention; they are not intended to illustrate all possible forms thereof. The words used are words of description rather than of limitation, and various changes may be made from that which is described here without departing from the spirit and scope of the invention.

What is claimed is:

1. A method of installing a fuel pump module through a hole in the top of a low profile fuel tank having a bottom and a top surface with a hole provided therein, the method comprising:

inserting a first end of the module into the fuel tank through the hole provided therein;

abutting the first end of the module against the bottom of the tank;

articulating the module about a first resiliently pinned connection to traverse the first end of the module along the bottom of the tank;

articulating the module about a second resiliently pinned connection to further traverse the first end of the module along the bottom of the tank;

seating a flange of the module against the hole in the tank; and urging the module against the bottom of the tank with the resiliently pinned connections after the flange is seated.

* * * * *